(12) United States Patent
Thapa (10) Patent No.: US 8,407,288 B2
(45) Date of Patent: Mar. 26, 2013

(54) EFFICIENT NETWORK ROUTING TO REDUCE BANDWIDTH USAGE AND LATENCY

(75) Inventor: Mukund N. Thapa, Palo Alto, CA (US)

(73) Assignee: Optical Fusion Inc., Palo Alto, CA (US)

( * ) Notice: Subject to any disclaimer, the term of this patent is extended or adjusted under 35 U.S.C. 154(b) by 301 days.

(21) Appl. No.: 12/820,418

(22) Filed: Jun. 22, 2010

(65) Prior Publication Data
US 2010/0325209 A1 Dec. 23, 2010

Related U.S. Application Data (60) Provisional application No. 61/219,367, filed on Jun. 22, 2009.

(51) Int. Cl.
*G06F 15/16* (2006.01)
(52) U.S. Cl. .................................. 709/204; 370/468
(58) Field of Classification Search .................. 709/204; 370/468
See application file for complete search history.

(56) References Cited

U.S. PATENT DOCUMENTS

| | | | | |
|---|---|---|---|---|
| 5,581,702 A | * | 12/1996 | McArdle et al. | 709/204 |
| 5,859,974 A | * | 1/1999 | McArdle et al. | 709/204 |
| 7,720,098 B1 | * | 5/2010 | Allen et al. | 370/468 |
| 7,937,442 B2 | * | 5/2011 | Sekaran et al. | 709/204 |
| 2002/0107008 A1 | | 8/2002 | Hendrey et al. | |
| 2006/0031527 A1 | * | 2/2006 | Soles et al. | 709/227 |
| 2007/0041366 A1 | | 2/2007 | Vugenfirer et al. | |
| 2007/0072618 A1 | * | 3/2007 | Freytsis et al. | 455/452.2 |
| 2007/0156908 A1 | | 7/2007 | Szomolanyi et al. | |
| 2008/0077665 A1 | * | 3/2008 | Sekaran et al. | 709/204 |

OTHER PUBLICATIONS

PCT International Search Report and Written Opinion, PCT Application No. PCT/US2010/039474, Aug. 17, 2010, six pages.

* cited by examiner

*Primary Examiner* — Thomas Dailey
(74) *Attorney, Agent, or Firm* — Fenwick & West LLP (57) ABSTRACT

A method (and corresponding system and computer program product) for efficiently routing a multi-person conference to reduce bandwidth usage and latency is described. Computing devices used by the participants to participate in the conference are separated into proximity pools based on direct accessibility. For each proximity pool, a computing device is selected as the key node. Only the key node communicates directly with a server, and redistributes data received from the server to its pool peers. Communications between computing devices within a same pool are routed directed to one another. Proximity pools can be refined to factor in distances among the computing devices. Multiple servers may be used to reduce latency. Proximity pools are assigned to nearby servers. Communications between computing devices in different proximity pools are routed through the server(s) associated with the different proximity pool.

20 Claims, 5 Drawing Sheets

FIG. 1

FIG. 2B
Pure P2P-Based Approach

FIG. 2A
Pure Server-Based Approach

FIG. 2E Third Hybrid Approach

FIG. 2D Second Hybrid Approach

FIG. 2C First Hybrid Approach

EFFICIENT NETWORK ROUTING TO REDUCE BANDWIDTH USAGE AND LATENCY

CROSS REFERENCE TO RELATED APPLICATIONS

This application claims the benefit of U.S. Provisional Application No. 61/219,367, "Efficient Routing" by Mukund N. Thapa, filed on Jun. 22, 2009, which is incorporated by reference herein in its entirety.

BACKGROUND OF THE INVENTION

1. Field of the Invention

The present invention relates generally to network communication. In particular, the present invention is directed towards systems and methods for improving network routing efficiency, for example, for videoconferencing.

2. Description of Background Art

Network multimedia applications, such as videoconferencing, consume a large amount of bandwidth. Multi-user communication applications such as video-conferencing, consume even more bandwidth compared to typical single user multimedia applications because multimedia data (e.g., audio, video) are transmitted among all users in (or near) real-time. In addition, as a result of factors such as insufficient network bandwidth and inefficient network routing, users of communication applications often experience high latency in the communication. For example, there may be a long delay from the time one user speaks to the time it is heard by the other users.

Network operators have adopted various techniques to increase and optimize network bandwidth to meet the increasing bandwidth demand. However, as more and more network-based devices, applications, and services become available, and more and more users start to use such devices, applications, and services, the actual available network bandwidth is still at a premium.

In addition, techniques such as hardware-based multicasting have been developed to help multi-user multimedia applications to reduce bandwidth usage and latency. However, these techniques require expensive hardware upgrades, and thus have not been widely implemented. Furthermore, because these techniques do not take into consideration factors such as whether the participants of a multi-user communication can communicate with one another directly, these techniques often do not provide optimum solutions.

Thus, there is a need for a way to reduce the bandwidth usage and latency for multi-user communication applications.

SUMMARY

Embodiments of the present disclosure include a method (and corresponding system and computer program product) for efficiently routing a multi-person conference to reduce bandwidth usage and latency. Computing devices used by the participants to participate in the conference are separated into proximity pools based on direct accessibility.

In one aspect, a computing device is selected for each proximity pool as the key node. Only the key node communicates directly with a server, and redistributes data received from the server to its pool peers. Communications between computing devices within a same pool are routed directly to one another. Proximity pools can be refined to factor in distances among the computing devices. Multiple servers may be used to reduce latency. Proximity pools are assigned to nearby servers. Communications between computing devices in different proximity pools are routed through the server(s) associated with the different proximity pools.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION OF THE PREFERRED EMBODIMENTS

Overview

Embodiments of the present disclosure provide methods (and corresponding systems and computer program products) for operating video conferences and delivering high image quality video conferences through low network bandwidth usage with low latency. The methods for operating video conferences and delivering high image quality video conferences can be implemented through a server-based video conferencing architecture, an example of which is described in detail below with regard to FIG. 1. One skilled in the art would readily understand that the present disclosure is not restricted to this architecture, and can be implemented in other architectures such as peer-to-peer (P2P) architecture.

Architecture of a Multi-Point Multi-Person Video Conferencing System

Figure 1:
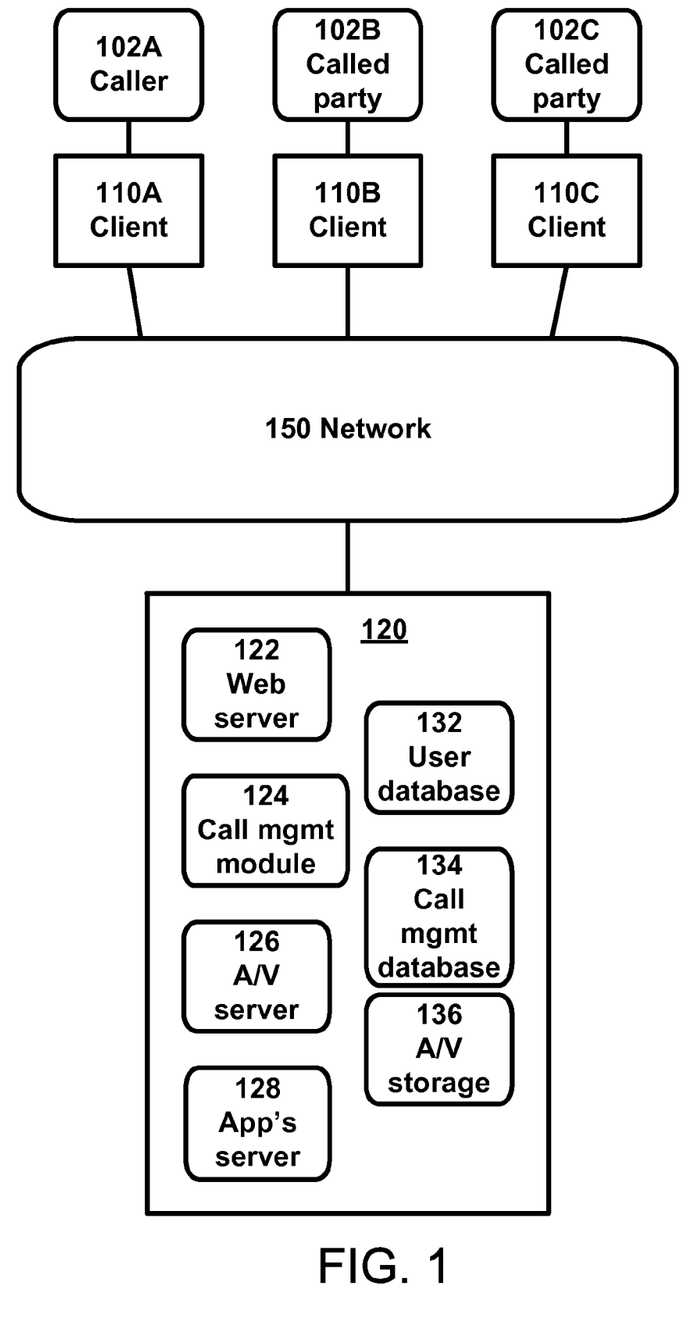
FIG. 1 is a block diagram of a server-based architecture suitable for use with the invention.

FIG. 1 is a block diagram of a server-based video conferencing architecture for a multi-point multi-person video conferencing system suitable for use with the invention. In this example, a participant 102A desires to have a video conference with two other participants 102B,102C. For convenience, participant 102A will be referred to as the caller and participants 102B,102C as the called parties. The caller 102A initiates the video conference by making an initial video conference call to the called parties 102B,102C. The called parties 102B,102C join the video conference by accepting caller 102A's video conference call.

Each participant 102 is operating a client device (also called a "computing device") 110, which connects via a network 150 to a central server 120. The network 150 may be a wired or wireless network. Examples of the network 150 include the Internet, an intranet, a WiFi network, a WiMAX network, a mobile telephone network, or a combination thereof. In this server-based architecture, the server 120 coordinates the set up and the tear down of the video conference. In this particular example, each client device 110 is a computer that runs client software with video conferencing capability. To allow full video and audio capability, each client device 110 includes a camera (for video capture), a display (for video play back), a microphone (for audio capture) and a speaker (for audio play back).

The client devices 110 are connected via the network 150 to the central server 120. In this example, the central server 120 includes a web server 122, a call management module 124, an audio/video server 126 and an applications server 128. The server 120 also includes user database 132, call management database 134 and audio/video storage 136. The participants 102 have previously registered and their records are stored in user database 132. The web server 122 handles the web interface to the client devices 110. The call management module 124 and call management database 134 manage the video conference calls, including the set up and tear down of video conferences. For example, the call management database 134 includes records of who is currently participating on which video conferences. It may also include records of who is currently logged in and available for video conference calls, their port information, and/or their video conferencing capabilities. The audio/video server 126 manages the audio streams, the video streams, and/or the text streams (collectively called media streams) for these video conferences. Streaming technologies, as well as other technologies, can be used. Storage of audio and video at the server is handled by audio/video storage 136. The application server 128 invokes other applications (not shown) as required.

Pool-Based Hybrid Routing for a Multi-Person Video Conference

According to one embodiment of the present invention, a pool-based hybrid routing approach is applied in multi-person video conferences to reduce the network bandwidth usage. In the pool-based approach, client devices 110 (also called computing devices in the following description) used by the participants to participate in the video conference are grouped into proximity pools. A proximity pool is a collection of computing devices each of which can interact directly with any other computing device in the collection without a server (e.g., the computing devices are either not behind any firewall or are behind the same firewall). A server is a hardware device and/or software program configured to manage the multi-person video conferences. Computing devices that belong to a same proximity pool communicate with each other directly. Computing devices of different proximity pools communicate indirectly through one or more servers. As a result, the number of streams transmitted between the server and each computing device is reduced compared to the pure server-based approach resulting in reduced Internet traffic (e.g., network traffic through two or more interconnected computer networks). Compared to the pure P2P-based approach where computing devices are in different proximity pools (e.g., in different physical local area networks (LANs)), the Internet traffic is significantly reduced. An additional advantage is that the latency is reduced for communications between several participants (e.g., those within a same proximity pool).

There may be one or more servers involved in a multi-person video conference using the pool-based hybrid routing approach. A server (or server group) may include one or more computer systems at a location working together to perform the tasks as one. The pool-based hybrid routing approach using a single server (also called the "single-server scenario") is described first, followed by a description of the pool-based hybrid routing approach using multiple servers (also called the "multi-server scenario").

Single-Server Pool-Based Hybrid Routing

Two example pool-based hybrid routing approaches are described below along with the pure server-based approach and the pure P2P-based approach, illustrated by an example and FIGS. 2A-D.

Figure 2A:
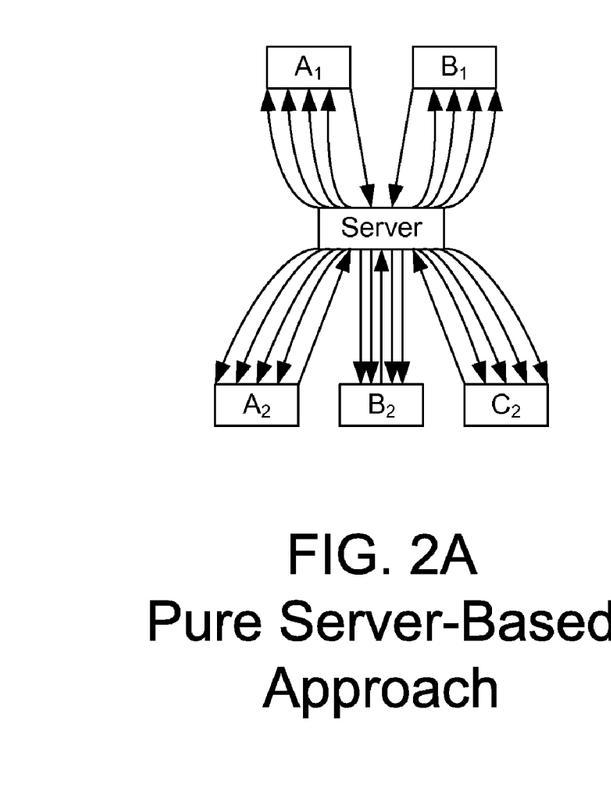
FIGS. 2A-E are block diagrams illustrating various routing approaches for a multi-person conference.

In a pure server-based approach, each computing device establishes one upstream connection to a central server for transmitting audio/video data originated from that computing device (also called an "upstream connection"), and multiple downstream connections from the server each of which is designated for receiving audio/video data originated from one other computing device (also called a "downstream connection"). In the following description, a stream or an upstream/downstream connection refers to a sequence of data packets transmitted from a sending entity (e.g., a computing device or a server) to a receiving entity. Data packets streamed in-between two entities can be transmitted via a single virtual connection established using any network protocol (e.g., User Datagram Protocol (UDP), Transmission Control Protocol (TCP), etc.). The pure server-based approach can be further illustrated through the following example along with FIG. 2A. FIG. 2A is a diagram illustrating the routing pathways among the computing devices using the pure server-based approach. As shown, each computing device has one upstream connection with the server for uploading its data to the server for distribution to the other four computing devices. Each computing device has four downstream connections from the server for receiving data from the other computing devices. In total there are 5 upstream connections and 20 downstream connections. These streams not only consume a large amount of server load, but also consume a large amount of network bandwidth.

Figure 2B:
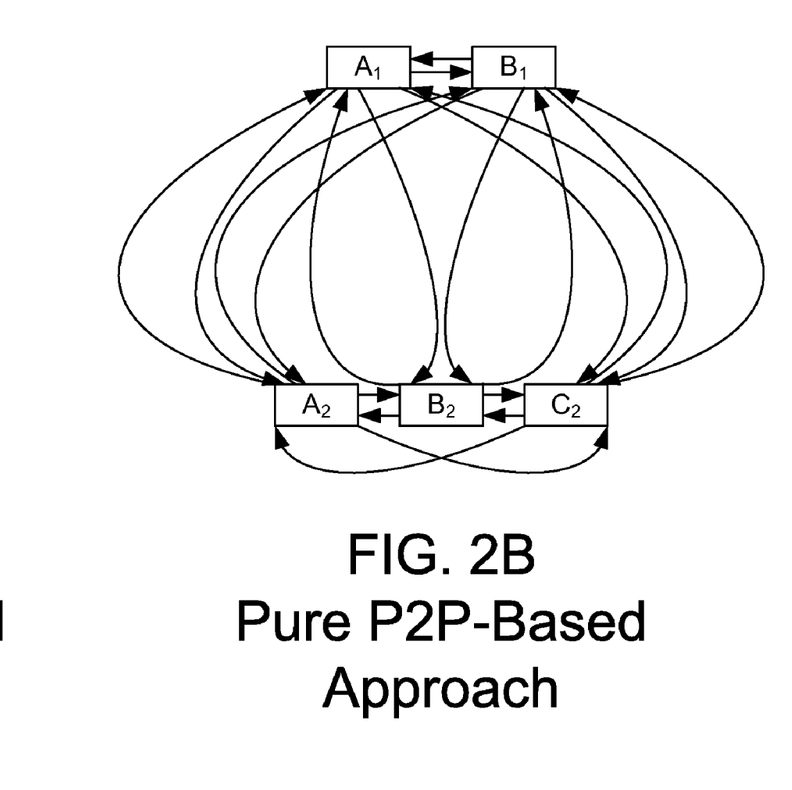

In a pure P2P-based approach, each computing device establishes two streams with every other computing device, one for receiving data stream from the other computing device, and the other for sending data stream to the other computing device. FIG. 2B is a diagram illustrating the routing pathways among the 5 computing devices in the above example using pure P2P approach. As shown, in total there are 20 streams among the 5 computing devices. This approach is especially bad for those that have asymmetric Internet connections where the upload bandwidth is much less than the download bandwidth.

Figure 2C:
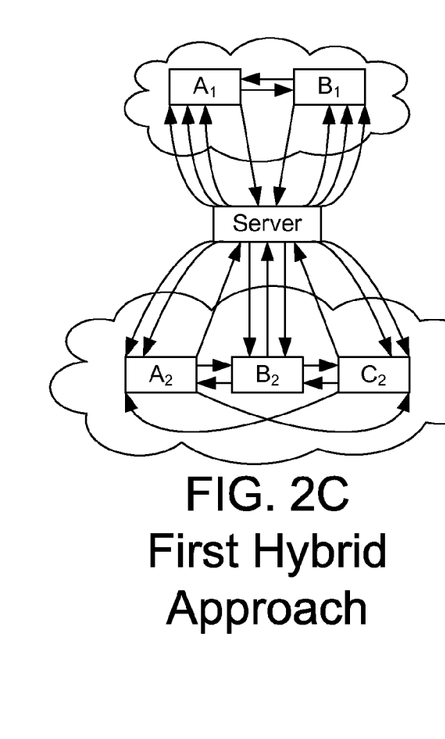

In a first pool-based hybrid approach (also called the "distributive approach"), communications between two computing devices within a proximity pool are routed directly between the two computing devices and not through the server, and communications between two computing devices in different pools are routed through the server. Continuing with the above example, FIG. 2C is a diagram illustrating the routing pathways among the 5 computing devices using the first hybrid approach. As shown, in total there are 8 streams between computing devices within a same proximity pool (also called "intra-pool streams"), 5 upstream inter-pool connections and 12 downstream inter-pool connections. Compared to the pure server-based approach, 8 of the downstream connections are replaced by 8 intra-pool streams.

Figures 2D, 2E:
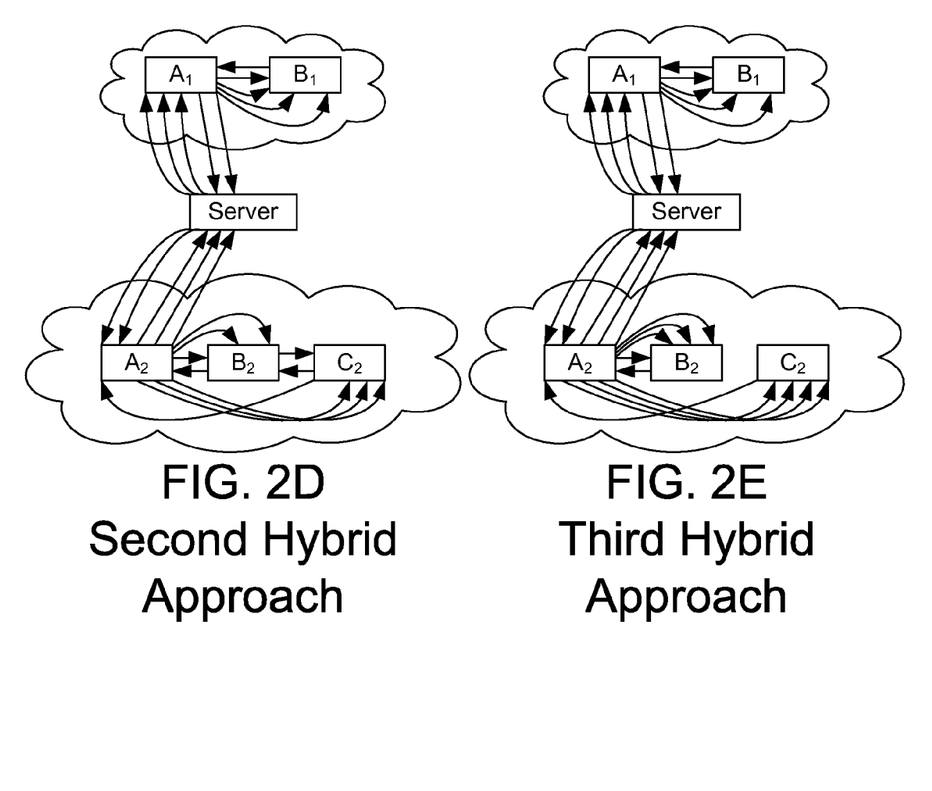

In a second pool-based hybrid approach, only one computing device (also called a "key node") from each proximity pool communicates with the server directly and redistributes the downstream inter-pool connections internally to its pool peers, and computing devices within a same proximity pool communicate with each other directly. FIG. 2D is a diagram illustrating the routing pathways in the above example using the second hybrid approach. As shown, only the key nodes of a proximity pool ($A_1$, $A_2$ in this example) communicate directly with the server, and the key nodes redistribute data received from the server within their proximity pools. For example, key node Ai has two upstream inter-pool connections with the server, one for uploading its own data and the other for uploading data received from $B_1$. The server sends both these data received from the two upstream inter-pool connections to key node $A_2$ in the other proximity pool through two downstream inter-pool connections. Key node $A_2$ accepts the data received from the two downstream inter-pool connections for self use and also reroutes them to $B_2$ and $C_2$ directly. In total there are 15 intra-pool streams, 5 upstream inter-pool connections, and 5 downstream inter-pool connections. Compared to the first hybrid approach, the number of downstream inter-pool connections is reduced from 12 to 5, at the cost of 7 additional intra-pool streams.

In a third pool-based hybrid approach, similar to the second pool-based hybrid approach, only key nodes from each proximity pool communicate with the server directly and redistribute the downstream inter-pool connections to their pool peers. Unlike the second pool-based hybrid approach, the key nodes also take on the responsibility to route communications among their pool peers. That is, computing devices in a proximity pool only communicate with the key node of the proximity pool, relying on the key node to route the communications to other pool peers. FIG. 2E is a diagram illustrating the routing pathways in the above example using the third hybrid approach. As shown, only the key nodes of a proximity pool ($A_1$, $A_2$ in this example) communicate directly with the server and pool peers, and the key nodes redistribute data received from the server and pool peers within their proximity pools. For example, key node $A_2$ not only reroutes data received from the two downstream inter-pool connections to $B_2$ and $C_2$ directly, but also routes data received from the two intra-pool streams with $B_2$ and $C_2$, to $C_2$ and $B_2$, respectively. Same as the second pool-based hybrid approach, in total there are 15 intra-pool streams, 5 upstream inter-pool connections, and 5 downstream inter-pool connections. Communications within a proximity pool (e.g., within a physical local area network (LAN)) typically only involve a local switch/router, and thus are not subject to limitations such as the upload bandwidth bottleneck. In addition, participants within a proximity pool experience very low latency for communications in between. As a result, the pool-based hybrid approach can be more efficient than the pure server-based approach and the pure P2P-based approach.

The following description focuses on the second pool-based hybrid approach. One skilled in the art will readily recognize from the description that other hybrid approaches may be implemented without departing from the principles described herein.

Figure 3:
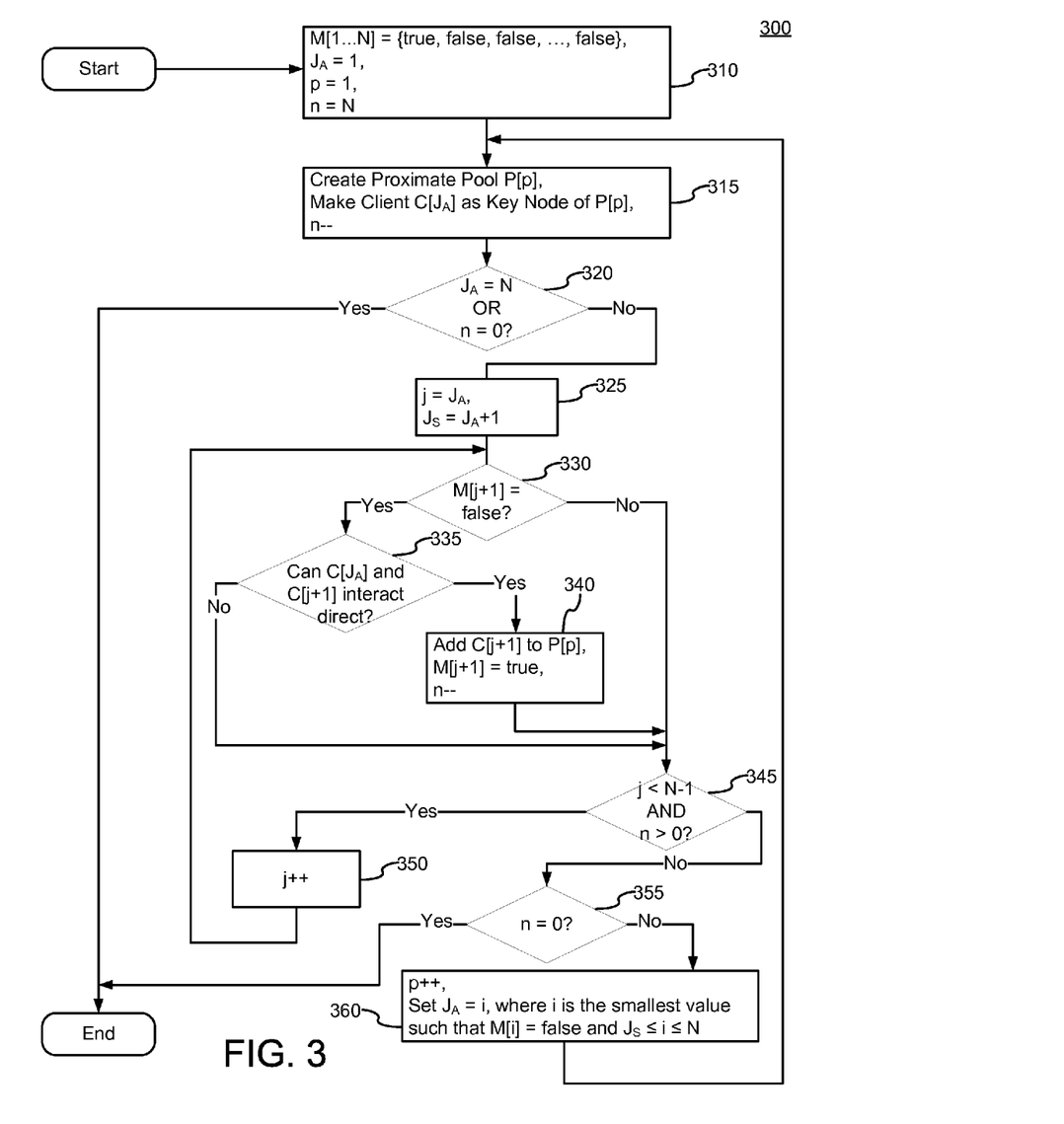
FIG. 3 is a flow diagram illustrating a process to create proximity pools and select key nodes.

Proximity Pool Creation and Key Node Selection for Single-Server Pool-Based Hybrid Routing FIG. 3 is a flow diagram illustrating a process 300 for creating proximity pools among computing devices used by participants to participate in a multi-person video conference and selecting key nodes for the proximity pools according to one embodiment of the present invention. Other embodiments can perform the steps of the process 300 in different orders. Moreover, other embodiments can include different and/or additional steps than the ones described herein. In the following discussion, it is assumed that the process 300 is executed by a server. In other embodiments, the process 300 is executed by a computing device or a combination of computers (e.g., computing device, server) collectively.

When a multi-person video conference is initiated, the process 300 starts. In the following discussion, it is assumed that the conference has a total of N computing devices denoted as an array (or another data structure such as a linked-list) $C[1, \ldots, N]$. The sequence of the array can be determined based on the sequence of the computing devices joining the conference (e.g., $C[1]$ represents the computing device used to initiated the conference, $C[2]$ represents the computing device used to join the conference after $C[1]$, etc.).

In step 310, a Boolean array (or other data structure such as a linked list) $M[1, \ldots, N]$ is created. The value of a member of the array (e.g., $M[i]$) indicates whether the corresponding computing device (e.g., $C[i]$) has been placed in a proximity pool. The initial values of members of the array are set to be False, with the exception of the first member, which is set to be True, indicating that the first computing device will be placed in the first proximity pool. A proximity pool counter p is set to be 1 to account for the first proximity pool to be created. A counter n that measures the total number of computing devices yet to be placed in proximity pools is set to be N. The value of a variable $J_A$, which indicates the first available computing device (i.e., the first computing device in the array $C[1, \ldots, N]$ not yet placed in a proximity pool), is set to be 1.

In step 315, a proximity pool $P[p]$ is created, a computing device $C[J_A]$ is selected (or labeled) as the key node of pool $P[p]$, and the value of the available counter n is reduced by 1. In step 320, the server determines if $J_A$ is equal to N (i.e., all computing devices have been processed) or n is equal to 0 (i.e., each computing device is in a pool already), and if so, the process 300 terminates. Otherwise, the process 300 advances to step 325, in which a variable j representing the current computing device is set to be the value of $J_A$, and a variable $J_S$ is set to be $J_A+1$.

In step 330, it is determined if the value $M[j+1]$ is equal to False, and if so step 335 determines whether computing devices $C[J_A]$ and $C[j+1]$ can interact directly. For example, the server instructs the computing devices $C[J_A]$ and $C[j+1]$ to (1) send a packet to each other directly (i.e., without a server) and (2) report back to the server whether it received the packet. The server can make the determination based on the responses from $C[J_A]$ and $C[j+1]$. If the two computing devices can interact directly, step 340 adds computing device $C[j+1]$ into pool $P[p]$, sets $M[j+1]$ to be True, and decrease counter n by 1.

After executing step 340, or if the two computing devices cannot interact directly, or if $M[j+1]$ is equal to True, the process 300 advances to step 345 and determines whether j is less than N−1 and n is greater than 0. If both conditions are true, then the process 300 advances to step 350, which increases the value of j by 1, and goes to step 330 as described above. Otherwise, if either condition is false, the process 300 advances to step 355 and determines whether n is equal to 0, and if so terminates the process 300. Otherwise, if n is larger than 0, the process 300 advances to step 360 and increases the value of variable p by 1, and sets the value of $J_A$ to the smallest value where the value of $M[J_A]$ is equal to False, for example, by looping through $M[i]$, from $i=J_S$ to N, to find the first (i.e., the smallest) $i=J_A$ such that $M[J_A]$ equals to False. The process 300 then goes to step 315.

Once the process 300 terminates, the applicable routing approach for the video conference can be determined based on the following conditions: (1) if p=N, then each computing device belongs to a different proximity pool, and the conference will be routed using the pure server-based approach; (2) if p=1, then all computing devices belong to a single proximity pool, and the conference will be routed using the pure P2P-based approach; and (3) if 1<p<N, then the computing devices belong to different proximity pools, and the conference will be routed using one of the pool-based hybrid approaches.

In process 300, the first computing device in each proximity pool joining the conference is selected as the key node for that pool. Additionally or alternatively, the selection of a key node in a proximity pool could be arbitrary or based on other criteria, such as the login time (or sequence), the time (or sequence) joining the conference, CPU speeds, memory capacities, and network bandwidths of the computing devices in that pool. In addition, the key node selection can be done after the proximity pool creation process, and thus the related steps to select the key node can be omitted from the process 300.

The proximity pools created using process 300 are based on direct accessibility among the computing devices. That is, each proximity pool created using process 300 includes computing devices that can communicate with on another directly. Computing devices that can interact directly may nevertheless be distant (geographic distance or network distance) from one another. Network distance is the distance (or cost, time etc.) involved for two computing devices to communicate with each other through the network. For example, computing devices that are far apart and from different physical local area networks (LANs) connected via the Internet may be able to communicate directly because that they are not behind firewalls, or that they are on the same virtual private network (VPN).

In one embodiment, to further improve the efficiency of the pool-based hybrid approach, the proximity pools created based on direct accessibility are refined to factor in the distances among the computing devices within a proximity pool by subdividing the proximity pool into refined proximity pools. Computing devices in one refined proximity pool not only can interact directly with one another, but also are in close enough proximity (e.g., located within a common geographic region). For example, the server examines the IP address of each computing device in a proximity pool against the IP ranges allotted by geographical region/country to determine the geographic location of the computing device. If the geographical locations of the computing devices within a proximity pool are not the same, then that proximity pool is subdivided into refined proximity pools based on the geographical location findings.

In another embodiment, the server takes into account the Round-Trip-Times (RTT) for sending packets to further refine the proximity pool determination. RTT is the time required for a computing device to send a signal to another computing device and back again. In this approach, the RTT is determined between every pair of computing devices in a proximity pool. If the RTT for two computing devices in a proximity pool exceeds a threshold value, then that proximity pool is subdivided into two and the two computing devices are placed in different refined proximity pools. In one embodiment, to reduce the computation needed, if RTT is determined from a first computing device to a second computing device, then it can be assumed that RTT for the second computing device to the first computing device is the same, and the one-way time is half the RTT. Once the RTTs are known, then if the RTTs for two computing devices are both below a threshold value, the two computing devices are considered to be in the same refined proximity pool. Otherwise those computing devices with higher RTT are grouped into separate refined proximity pools.

In yet another embodiment, the server considers the public Internet Protocol (IP) addresses and the private IP addresses of the computing devices in refining the proximity pools. A public IP address is the IP address assigned to computing devices connected to the Internet for communicating with other devices through the Internet. A private IP address is the IP address assigned to computing devices connected to a private network for communicating with other devices within that private network. If the public IP address of a computing device is the same as its private IP address, then the computing device is not behind a firewall. If the public IP address of a computing device is different from its private IP address, then the computing device is behind a firewall or proxy server. If the public IP addresses are the same for two computing devices and their private IP addresses are also the same, then the two computing devices are on different LANs behind different firewalls. As a result, the two computing devices on different LANs can be placed in different refined proximity pools.

In one embodiment, if a proximity pool is subdivided for reasons other than direct accessibility, such as those mentioned above, then the key nodes of these refined proximity pools can interact directly with one another rather than through the server. In another embodiment, instead of first generating the proximity pools based on direct accessibility, and then subdividing the proximity pools into refined proximity pools, the computing devices can first be grouped into refined pools (e.g., based on factors such as geographic proximity and RTT among the computing devices), and then subdivided into refined proximity pools based on direct accessibility.

Packet Routing for Single-Server Pool-Based Hybrid Routing

The implementation of the pool-based hybrid routing approaches involves both packet distribution and packet centralization, according to one embodiment of the present invention. Packet distribution refers to multicast routing techniques for multiple computing devices to send and receive packets directly from one another. Packet centralization refers to multicast routing techniques for multiple computing devices to send and receive packets from one single computing device. In the following discussion, a packet refers to a formatted unit of data carried by a packet mode computer network. Examples of a packet include an Internet Protocol (IP) packet such as an IPv4 packet and an IPv6 packet. The data in the packet may be audio, video, text, or any other type of information transmitted among the computing devices and/or the server.

According to one embodiment, the server maintains two lists for each video conference: a Conference Participant List (CPL) and a Send To List (STL). The CPL includes the following information for all computing devices: the unique participant identifier (ID) of the associated participant, the network identifier (e.g., IP address) of the computing device, and the key node identifier (e.g., the participant ID or network ID of the corresponding key node) associated with the computing device. The STL includes the following information for all key nodes of the conference: the unique participant ID of the associated participant, and the network ID of the key node. For example, the server maintains a conference list (or table) of video conferences each of which is uniquely identified by a conference identifier (ID). The conference list, in addition to the conference ID, also includes references (e.g., pointers) to the CPL and the STL for each of the video conferences. In another embodiment, instead of two separate lists, the server maintains only one list for all computing devices with the following information for each computing device of the conference: the unique participant ID of the associated participant, the network ID of the computing device, and the participant ID associated with the key node associated with the computing device.

When a packet is received from a computing device, the server identifies the key node associated with the computing device in the CPL, and redirects the packet to other key nodes in the STL. For example, the server (1) extracts the conference ID and the sender's participant ID from the packet, (2) matches the participant ID with the participant ID for each computing device in the CPL associated with the conference ID to obtain the participant ID of the key node associated with the matching computing device, and (3) routes the packet to the IP addresses of each key node in the STL associated with the conference ID that does not correspond to the key node identified above. In one embodiment, the packet includes an identifier (e.g., the participant ID) of the key node of the sender computing device. As a result, the server can search the identifier in the STL to determine the key node associated with the sender computing device without resorting to the CPL. Alternatively or additionally, because only key nodes communicate directly with the server in the second (and third) hybrid approach, the server may determine the key node of the sender computing device by examining the source address (e.g., IP address) of the packet.

According to one embodiment, each key-node maintains two lists: an External Send to List (ESL) and a Member Send to List (MSL). The MSL includes all other computing devices in the same proximity pool as the key node. The ESL includes the server and possibly key nodes in other proximity pools that can be reached without the server (e.g., refined proximity pools subdivided from the same proximity pool as the pool to which the key node belongs). Packets generated by the key node computing device are routed to each member of the ESL (e.g., to the server) and each computing device of the MSL (e.g., pool peers). For each received packet, the key node determines if the packet came from a computing device in the MSL, and if so then route the packet to every member in the ESL, and otherwise to every member in the MSL. Unlike key nodes, each non-key node computing device only maintains a MSL. The non-key node computing device does not route received packets and routes packages it generated to each member of the MSL (e.g., pool peers).

In another embodiment, the key node computing devices can be configured (e.g., by use of an internal setting or a flag variable) to route communications among the pool peers (e.g., the third pool-based hybrid approach). In this embodiment, a non-key node computing device only route packets it generated to the key node and no one else. The key node, for each packet it receives, determines if the packet came from a computing device in the MSL, and if so then route the packet to every member in the ESL and every member in the MSL except the sender. For packets received from a member in the ESL, the key node routes the packet to every member in the MSL.

In yet another embodiment, the non-key node computing devices, similar to the key nodes, have both the ESL and the MSL, and routes packets generated by the non-key node computing devices to the members in the ESL directly and not through the key node (e.g., the first pool-based hybrid approach). In this embodiment, the key node does not route packages received from members in the MSL to members in the ESL.

By maintaining the information (e.g., network identifier) for the key nodes in the lists (e.g., STL, MSL), the server and the computing devices can be easily reconfigured to apply different routing approaches. For example, to switching to the pure server-based approach, the STL for the server can be reconfigured to include all computing devices, and the MSLs for the computing devices can be reconfigured to include the server only. As a result, all computing devices communicate with the server directly.

Multi-Server Pool-Based Hybrid Routing

When there are 3 or more proximity pools (or refined proximity pools) in a multi-person video conference, using multiple servers in the video conference may reduce the communication latency in the video conference, according to one embodiment of the present invention. The process for creating and refining proximity pools, and selecting key nodes for the proximity pools are the same as described above. Each proximity pool is assigned to a server, and each server is associated with one or more proximity pools. Communications between two computing devices of two proximity pools are routed through the server(s) associated with the two proximity pools.

According to one embodiment, proximity pools are assigned to nearby servers to reduce latency of the video conference. The pool-server assignment can be based on factors such as geographic distance and network distance. The following example illustrates the pool-server assignment based on geographic proximity. Assume that computing devices $A_1$ (key node) and $B_1$ are located in San Francisco and in a first proximity pool, computing devices $A_2$ (key node), $B_2$, and $C_2$ are in San Jose and in a second proximity pool, computing devices $A_3$ (key node) and $B_3$ are in Paris, France and in a third proximity pool. Server $S_1$ is in San Francisco, and server $S_2$ is in Paris, France. Based on geographic proximity, the first proximity pool and the second proximity pool are assigned to the server $S_1$, and the third proximity pool is assigned to the server $S_2$.

Figure 4:
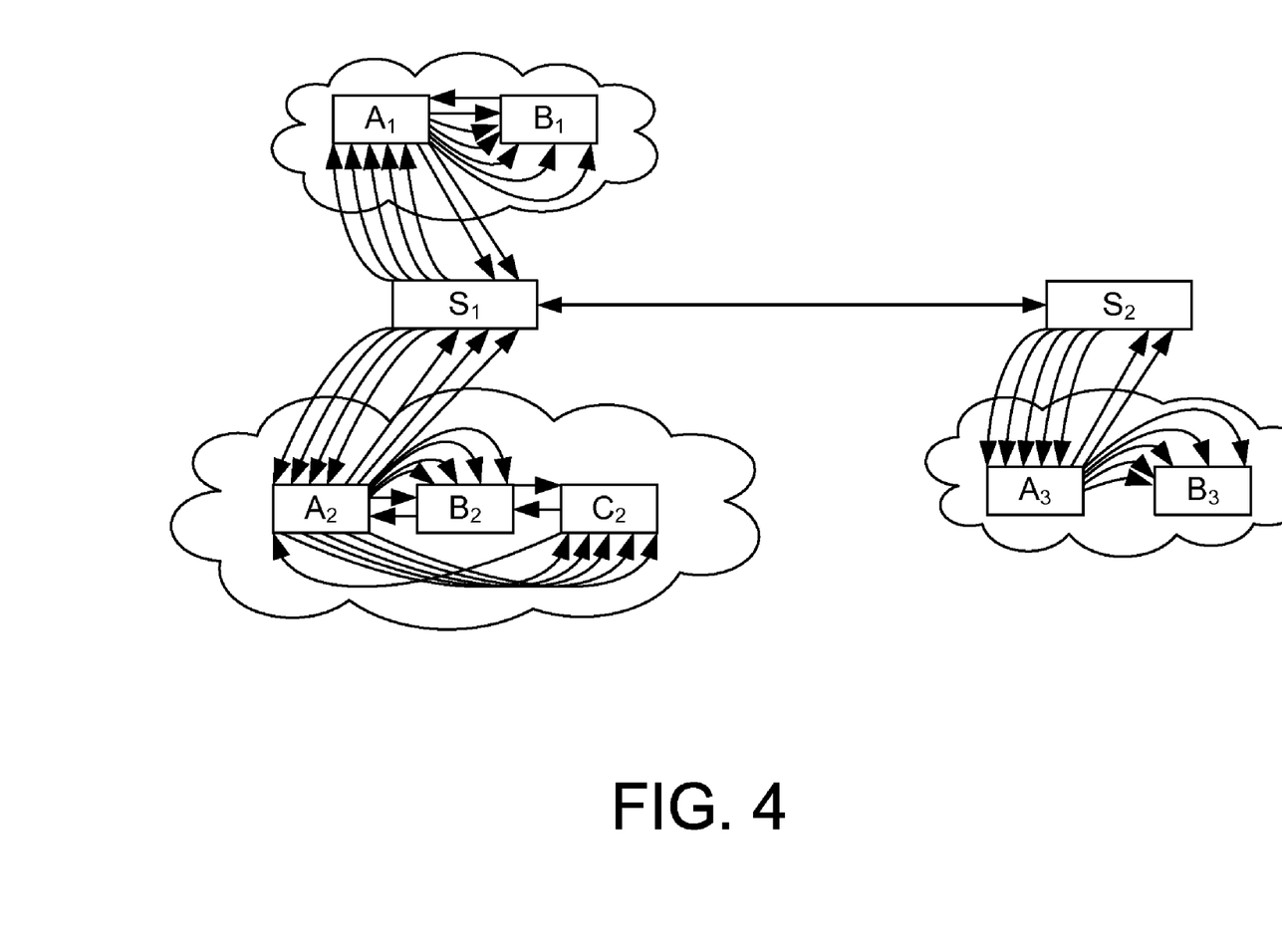
FIG. 4 is a block diagram illustrating a pool-based hybrid routing approach that involves multiple servers.

FIG. 4 illustrates the routing pathways among the computing devices and the servers in the above example in a hybrid approach in which only key nodes communicates with servers directly and pool peers communicates directly. As shown, communications between a computing device of the first pool (e.g., $A_1$, $B_1$) and a computing device of the second pool (e.g., $A_2$, $B_2$, $C_2$) are routed through $S_1$ alone, communications between a computing device of the first or second pool (e.g., $A_1$, $B_1$, $A_2$, $B_2$, $C_2$) and a computing device of the third pool (e.g., $A_3$, $B_3$) are routed through $S_1$ and $S_2$. Because communications between computing devices in San Francisco (first pool, $A_1$, $B_1$) and computing devices in San Jose (second pool, $A_2$, $B_2$, $C_2$) are routed through a nearby server located in San Francisco ($S_1$), instead of a far away server located in Paris ($S_2$), latency (delay in communication) is significantly reduced for the video conference. In addition, communications between two servers may be made through a single virtual connection established using a transmission protocol (e.g., the Transmission Control Protocol (TCP)), as shown in FIG. 4.

Assuming, in addition to the above three proximity pools, a fourth proximity pool including computing devices $A_4$ and $B_4$ close to Paris are involved in the multi-person conference. Because both the third proximity pool (e.g., $A_3$, $B_3$) and the fourth proximity pool (e.g., $A_4$, $B_4$) are close to $S_2$, both proximity pools are assigned to $S_2$. When $S_2$ receives a packet from the key node of the third (or fourth) proximity pool, $S_2$ sends the packet to $S_1$ and the key node of the fourth (or third) proximity pool according to its STL. When $S_2$ receives a packet from the key node of the first or second proximity pool (via $S_1$), $S_2$ transmits the packets to the key nodes of the third and fourth proximity pools, according to its STL. Similarly, the STL of the $S_1$ is configured such that $S_1$ transmits packets received from the third or fourth proximity pool (via $S_2$) to the key nodes of the first and second proximity pools, and transmits packets received from the first (or second) proximity pool to the key node of the second (or first) proximity pool and $S_2$.

To further advance the above example, assuming, in addition to the four proximity pools, the multi-person conference includes three other proximity pools, the fifth, sixth, and seventh proximity pools including computing devices $A_5$ and $B_5$, $A_6$ and $B_6$, and $A_7$ and $B_7$, respectively. Computing devices in the fifth, sixth, and seventh proximity pools are all assigned to a nearby server $S_3$. In this example, when $S_1$ receives a packet from the first proximity pool, $S_1$ transmits the packet to the key node of the second proximity pool, $S_2$, and $S_3$, according to its STL. Similarly, $S_2$ and $S_3$ transmit packets from one assigned proximity pool to the other assigned proximity pool(s), and the other servers, according to their STLs.

In addition, multi-server pool-based hybrid routing can be used to reduce traffic over a network section known to have a bottleneck in terms of bandwidth. Further, a server may communicate to key nodes of proximity pools not associated with the server based on factors such as load balancing, bandwidth considerations, and geographical locations of the servers as illustrated above.

Packet Routing for Multi-Server Pool-Based Hybrid Routing

Similar to the package routing mechanism for the single-server pool-based hybrid routing, one embodiment of the packet routing for multi-server pool-based hybrid routing are implemented using lists on the server and the computing devices. Alternative embodiments may use database tables and/or other in-memory data-structures such as arrays.

According to one embodiment, each server maintains two lists for each video conference: a Conference Participant List (CPL) and a Send To List (STL). The CPL, similar to the CPL in the single-server scenario, includes the participant ID and the network ID of each computing device in the conference. The STL includes information necessary for the server to route packets to key nodes of assigned proximity pools and to the other servers. For example, the STL includes an entry for each key node that includes (1) the participant ID of the participant associated with the key node, (2) the network ID for the key node, and (3) a list of network addresses to route packets received from the key node, and optionally the number of the network addresses in the list.

When a packet is received by a server from a computing device for a conference, the server first retrieves the CPL and the STL for that conference based on the conference ID in the packet. The server then checks the participant ID of the packet sender against each member of CPL to identify the participant ID of the corresponding key node. The server then uses the participant ID of the key node to check against the STL to obtain the network address list associated with the key node, routes the packet to each of the network addresses in the list. Similar to what is described in the single-server scenario, if the participant ID of the key node associated with the sender is in the packet (e.g., packet header) then the server can use the STL alone to route the packet without resorting to the CPL.

The mechanism of the packet routing can be illustrated using the above example and FIG. 4. In the STL of $S_2$, the network address list for $A_3$ includes only the network address of $S_1$, and the network address lists for $A_1$ and $A_2$ include only the network address of $A_3$. Thus, when $S_2$ receives a packet from $A_3$, $S_2$ routes the packet to $S_1$. On the other hand, when $S_2$ receives packets from $A_1$ and $A_2$ (via $S_1$), $S_2$ routes these packets to $A_3$. In the STL of $S_1$, the network address list for $A_3$ includes the network addresses of $A_1$ and $A_2$, the network address list for $A_1$ includes the network address of $S_2$ and $A_2$, and the network address list for $A_2$ includes the network address of $S_2$ and $A_1$. Thus, when $S_1$ receives a packet from $A_3$ (via $S_2$), $S_1$ routes the packet to $A_1$ and $A_2$. When $S_1$ receives a packet from $A_1$ (or $A_2$) $S_1$ routes the packet to $S_2$ and $A_2$ (or $A_1$).

The mechanism for a computing device (key node or not) is the same as described in the single-server scenario.

Additional Considerations

The proximity pool creation and refinement may take some time to complete. According to one embodiment, instead of delaying the start of the conference until the proximity pools are created and refined, once a conference is initiated, the call notification is sent to all participants other than the initiator. The conference at this stage is set to be entirely server-based with each computing device sending and receiving media packets via a central server. Simultaneously, the proximity pool creation and refinement process is initiated (e.g., by the server). Once the proximity pools are created and refined, the routing approach is transitioned based on the following conditions: (1) if each computing device belongs to a different proximity pool, then the conference is routed using the pure-server based approach and the conference continues as initially set up; (2) if all computing devices belong to a single proximity pool, then the conference will be routed using the pure P2P-base approach, and the computing devices are directed to route subsequent media packets directly to one another; (3) otherwise the conference will be routed using the pool-based hybrid approach described above, and the proximity pools are assigned to server(s) which creates tables and routes subsequent media packets accordingly.

One embodiment of the present disclosure supports an open video conference in which participants can freely join and leave. Dynamic participation may cause key node change. For example, a change in key node occurs when a key node leaves a conference and the remaining computing devices continue. Additionally, a change in key node may be necessary during a conference when a key node cannot handle its role as a key node (e.g., routing packets to the server and pool peers). When it is necessary to change a key node for a proximity pool, the server assigned to the proximity pool notifies another computing device in the proximity pool to start acting as the new key node, notifies the previous key node to cease to act as the key node (if still in the conference), and notifies the pool peers and other servers of the key node change. Alternatively, the new key node, instead of the server, notifies the pool peers about the key node change. The lists on the new key node are updated to perform the tasks, as described above, of the key node. The lists on the servers are also updates to reflect the key node change.

The present disclosure, in addition to providing efficient routing for multi-person conferences, is also applicable to improving network communication for other multi-party network applications (or services), such as, for example, white boarding, web-conferencing, and desktop sharing.

The present invention has been described in particular detail with respect to a limited number of embodiments. One skilled in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Different (database and/or in-memory) data structures such as lists and arrays may be used to achieve the same (or similar) functionality.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDs, DVDs, Blu-Ray Discs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method for routing communications of a multi-participant conference, each participant using a computing device to participate in the conference, the method comprising:
creating a plurality of proximity pools each of which comprises one or more computing devices, wherein each computing device is used by a participant to participate in the conference and wherein the step of creating the proximity pools comprises:
(a) a server instructing a candidate first computing device not yet in a proximity pool and a second computing device already in a proximity pool to send packets directly to each other;
(b) the server receiving a report from the first and the second computing devices reporting whether the packets were received;
(c) placing the candidate first computing device into a proximity pool different from the second computing device's proximity pool, if the received report indicates that the packets were not received; and
repeating the process of steps (a)-(c) until all computing devices participating in the multi-participant conference have been placed into proximity pools; and
for communications containing audio/video data originated by a computing device in a proximity pool:
the server receiving the communications via an upstream connection from said proximity pool to the server;
the server not transmitting the communications to other computing devices within said proximity pool; and
the server transmitting the communications via a downstream connection from the server to other proximity pool(s).

2. The computer-implemented method of claim 1, wherein for each proximity pool a computing device is selected from the computing devices in the proximity pool as a key node of the proximity pool, wherein transmitting the communications via a downstream connection from the server to computing devices in other proximity pools comprises transmitting the data to key nodes of the other proximity pools.

3. The computer-implemented method of claim 2, wherein the key node for a proximity pool is selected based on one or more of the following factors: the sequence of computing devices in the proximity pool joining the conference, the CPU speeds of the computing devices, the memory capacities of the computing devices, and the network bandwidths of the computing devices.

4. The computer-implemented method of claim 2, wherein only a key node of a proximity pool communicates with the server directly, and other computing devices in the proximity pool communicates with the key nodes directly.

5. The computer-implemented method of claim 2, wherein the server comprises a list of participants of the conference and a list of the key nodes of the plurality of proximity pools.

6. The computer-implemented method of claim 1, further comprising:
refining a proximity pool by subdividing the proximity pool into a plurality of refined proximity pools based on distances among computing devices in the proximity pool.

7. The computer-implemented method of claim 6, wherein refining the proximity pool comprises:
subdividing computing devices in different geographic regions into different refined proximity pools.

8. The computer-implemented method of claim 6, wherein refining the proximity pool comprises:
subdividing computing devices with Round-Trip-Times exceeding a threshold value into different refined proximity pools.

9. The computer-implemented method of claim 1, wherein a plurality of servers are used for routing communications of the multi-participant conference, the method further comprising:

for each of the plurality of proximity pools, assigning a server that is nearby to computing devices in the proximity pool to the proximity pool, wherein communication between a computing device in the proximity pool and a computing device outside the proximity pool is routed through the server assigned to the proximity pool.

10. The computer-implemented method of claim 9, wherein routing the data to computing devices in other proximity pools comprises:

routing, by the server, the data received from a computing device in a proximity pool assigned to the server to rest of the plurality of servers and other proximity pools assigned to the server.

11. A computer system for routing communications of a multi-participant conference, each participant using a computing device to participate in the conference, the computer system comprising:

a non-transitory computer-readable storage medium storing executable computer program code, the computer program code comprising program code for:

creating a plurality of proximity pools each of which comprises one or more computing devices, wherein each computing device is used by a participant to participate in the conference, and wherein the step of creating the proximity pools comprises:
  (a) a server instructing a candidate first computing device not yet in a proximity pool and a second computing device already in a proximity pool to send packets directly to each other;
  (b) the server receiving a report from the first and the second computing devices reporting whether the packets were received;
  (c) placing the candidate first computing device into a proximity pool different from the second computing device's proximity pool, if the received report indicates that the packets were not received; and
  repeating the process of steps (a)-(c) until all computing devices participating in the multi-participant conference have been placed into proximity pools; and for communications containing audio/video data originated by a computing device in a proximity pool:
  the server receiving the communications via an upstream connection from said proximity pool to the server;
  the server not transmitting the communications to other computing devices within said proximity pool; and
  the server transmitting the communications via a downstream connection from the server to other proximity pool(s).

12. The computer system of claim 11, wherein for each proximity pool a computing device is selected from the computing devices in the proximity pool as a key node of the proximity pool, wherein transmitting the communications via a downstream connection from the server to computing devices in other proximity pools comprises transmitting the data to key nodes of the other proximity pools.

13. The computer system of claim 12, wherein only a key node of a proximity pool communicates with the server directly, and other computing devices in the proximity pool communicates with the key nodes directly.

14. The computer system of claim 11, wherein the computer program code further comprises program code for:

refining a proximity pool by subdividing the proximity pool into a plurality of refined proximity pools based on distances among computing devices in the proximity pool.

15. The computer system of claim 14, wherein refining the proximity pool comprises:

subdividing computing devices with Round-Trip-Times exceeding a threshold value or computing devices in different geographic regions into different refined proximity pools.

16. A non-transitory computer-readable storage medium encoded with executable computer program code for routing communications of a multi-participant conference, each participant using a computing device to participate in the conference, the computer program code comprising program code for:

(a) a server instructing a candidate first computing device not yet in a proximity pool and a second computing device already in a proximity pool to send packets directly to each other;
(b) the server receiving a report from the first and the second computing devices reporting whether the packets were received;
(c) placing the candidate first computing device into a proximity pool different from the second computing device's proximity pool, if the received report indicates that the packets were not received; and
repeating the process of steps (a)-(c) until all computing devices participating in the multi-participant conference have been placed into proximity pools; and for communications containing audio/video data originated by a computing device in a proximity pool:
  the server receiving the communications via an upstream connection from said proximity pool to the server;
  the server not transmitting the communications to other computing devices within said proximity pool; and
  the server transmitting the communications via a downstream connection from the server to other proximity pool(s).

17. The non-transitory computer-readable storage medium of claim 16, wherein for each proximity pool a computing device is selected from the computing devices in the proximity pool as a key node of the proximity pool, wherein transmitting the communications via a downstream connection from the server to computing devices in other proximity pools comprises transmitting the data to key nodes of the other proximity pools.

18. The non-transitory computer-readable storage medium of claim 17, wherein only a key node of a proximity pool communicates with the server directly, and other computing devices in the proximity pool communicates with the key nodes directly.

19. The non-transitory computer-readable storage medium of claim 16, wherein the computer program code further comprises program code for:

refining a proximity pool by subdividing the proximity pool into a plurality of refined proximity pools based on distances among computing devices in the proximity pool.

20. The non-transitory computer-readable storage medium of claim 19, wherein refining the proximity pool comprises:

subdividing computing devices with Round-Trip-Times exceeding a threshold value or computing devices in different geographic regions into different refined proximity pools.

* * * * *